US009414568B2

(12) United States Patent
Veness et al.

(10) Patent No.: US 9,414,568 B2
(45) Date of Patent: Aug. 16, 2016

(54) MANUAL PORTION CONTROL FEEDER

(71) Applicant: Doskocil Manufacturing Company, Inc.

(72) Inventors: David Veness, Fort Worth, TX (US); Vasitha Obeyesekere, Farmers Branch, TX (US); Melaney Northrop, Mansfield, TX (US)

(73) Assignee: DOSKOCIL MANUFACTURING COMPANY, INC, Arlington, TX (US)

( * ) Notice: Subject to any disclaimer, the term of this patent is extended or adjusted under 35 U.S.C. 154(b) by 493 days.

(21) Appl. No.: 13/780,368

(22) Filed: Feb. 28, 2013

(65) Prior Publication Data

US 2013/0233248 A1  Sep. 12, 2013

Related U.S. Application Data

(60) Provisional application No. 61/604,271, filed on Feb. 28, 2012.

(51) Int. Cl.
*A01K 5/01* (2006.01)
*A01K 5/02* (2006.01)

(52) U.S. Cl.
CPC ............ *A01K 5/0114* (2013.01); *A01K 5/0275* (2013.01)

(58) Field of Classification Search
CPC .. A01K 5/0275; A01K 5/0114; A01K 5/0135
USPC ................ 119/56.1, 52.1, 54; 222/185.1, 368
See application file for complete search history.

(56) References Cited

U.S. PATENT DOCUMENTS

| | | | |
|---|---|---|---|
| 866,724 A * | 3/1907 | Hitzert ...................... 222/185.1 |
| 3,315,641 A * | 4/1967 | Cochran .......................... 119/53 |
| 4,722,300 A * | 2/1988 | Walker ................. A01K 5/0291 119/51.11 |
| 4,840,143 A * | 6/1989 | Simon .......................... 119/52.1 |
| 5,033,412 A * | 7/1991 | Brennan .............. A01K 5/0216 119/51.11 |
| 5,239,943 A * | 8/1993 | Kim ..................... A01K 5/0291 119/51.12 |
| 6,450,754 B1 * | 9/2002 | Catton .......................... 414/415 |
| 6,477,981 B1 * | 11/2002 | Harper ........................ 119/52.4 |
| 6,783,033 B1 * | 8/2004 | Chan ............................. 222/166 |
| 6,935,535 B2 * | 8/2005 | Pandolfi et al. ............ 222/146.5 |
| 6,971,331 B1 * | 12/2005 | Rohrer ............................ 119/77 |
| 6,988,464 B1 * | 1/2006 | Rutledge ................... 119/51.01 |
| 7,237,699 B2 * | 7/2007 | Zill et al. ...................... 222/636 |
| 7,703,639 B2 * | 4/2010 | Landau et al. .................... 222/1 |
| 7,766,195 B2 * | 8/2010 | Ryan et al. .................... 222/368 |

(Continued)

*Primary Examiner* — David Parsley
*Assistant Examiner* — Morgan T Barlow
(74) *Attorney, Agent, or Firm* — Global IP Counselors, LLP

(57) ABSTRACT

An improved manual portion control feeder includes a food delivery mechanism that is in communication with a food reservoir and which, when actuated, dispenses a predetermined amount of food from the reservoir into another vessel. Advantageously, the feeding apparatus further includes a feedback mechanism which, responsive to an actuation of the food delivery mechanism, provides at least one of an acoustic indication and a tactile indication that is representative of the dispensing of a predetermined quantity of food by the food delivery mechanism. The acoustic and/or tactile indication enables the feeding apparatus to remain disposed on, for example, a floor and alerts the user that a predetermined amount of food has been dispensed from the reservoir since the acoustic and/or tactile indications are detectable with relative ease. This enables an animal to be provided a predetermined amount of food with minimal attention being required of the user.

4 Claims, 11 Drawing Sheets

(56) References Cited

U.S. PATENT DOCUMENTS

| | | |
|---|---|---|
| 7,913,647 B1* | 3/2011 | Martin .................. 119/52.1 |
| 2002/0174834 A1* | 11/2002 | van den Berg ............. 119/51.02 |
| 2003/0234264 A1* | 12/2003 | Landau .................. 222/368 |
| 2004/0222241 A1* | 11/2004 | Link et al. .................. 222/185.1 |
| 2004/0232163 A1* | 11/2004 | Reinsch et al. ............. 222/77 |
| 2005/0061252 A1* | 3/2005 | Meeks et al. ............. 119/51.02 |
| 2005/0217591 A1* | 10/2005 | Turner et al. ............. 119/51.02 |
| 2005/0269366 A1* | 12/2005 | Brundick et al. .......... 222/185.1 |
| 2010/0236419 A1* | 9/2010 | Righetti et al. ............. 99/289 R |
| 2010/0276442 A1* | 11/2010 | Querfurth et al. ............. 222/1 |
| 2010/0320236 A1* | 12/2010 | Hassan .................. 222/368 |
| 2011/0062187 A1* | 3/2011 | Johnson et al. ........... 222/153.14 |
| 2011/0163133 A1* | 7/2011 | Moretto .................. 222/460 |
| 2012/0234865 A1* | 9/2012 | Renyer et al. ............. 222/185.1 |
| 2012/0267401 A1* | 10/2012 | Schroedter .................. 222/368 |
| 2013/0284100 A1* | 10/2013 | MacKelvie .................. 119/57.8 |
| 2013/0299519 A1* | 11/2013 | Gold et al. .................. 222/368 |
| 2014/0190987 A1* | 7/2014 | Brundick et al. ............. 222/1 |
| 2014/0284357 A1* | 9/2014 | Brundick .................. 222/185.1 |
| 2014/0305970 A1* | 10/2014 | Musumeci .................. 222/228 |

\* cited by examiner

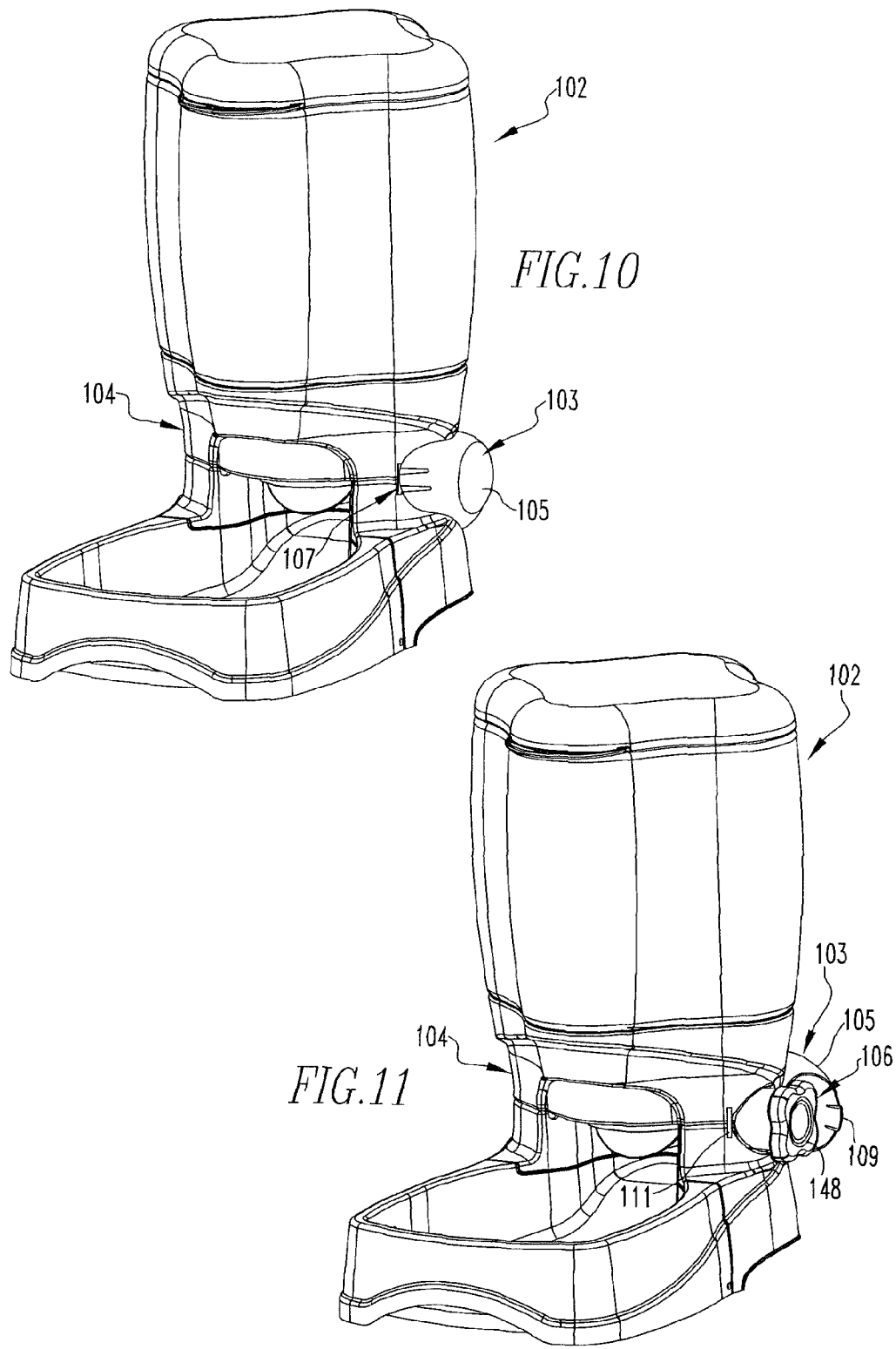

MANUAL PORTION CONTROL FEEDER

CROSS-REFERENCE TO RELATED APPLICATION

The instant application claims priority from U.S. Provisional Patent Application Ser. No. 61/604,271 filed Feb. 28, 2012, and entitled Manual Portion Control Feeder, the disclosures of which are incorporated herein by reference.

BACKGROUND

1. Field

The disclosed and claimed concept relates generally to a feeding apparatus for an animal and, more particularly, to a feeding apparatus that enables controlled amounts of food to be dispensed for consumption by an animal.

2. Related Art

Gravity feeding devices are generally well known in the relevant art. Such gravity-operated devices typically include a hopper or other storage receptacle that is configured to store food and that is connected with another receptacle such as bowl or trough into which the food is dispensed for consumption by an animal. As the animal eats the food in the bowl or trough, the food reservoir refills that space in the bowl according to the static angle of repose of the (particulate) food that is being dispensed.

For animals such as dogs and cats that spend some or all of their time indoors, amounts of food that are essentially unlimited can cause the animal to become overweight, which is undesirable. As such, pet owners have provided food to pets by transferring a measured amount of food from a bin or a bag into the pet's bowl, or they have employed an electronically-operated portion control food dispenser. While these methodologies have been generally effective for their intended purposes, they have not been without limitation.

Such manual measurement of an amount of food and the transfer of such food from a bin or bag into a pet's bowl can become tedious. Moreover, the accuracy of the amount of food delivered to the pet is typically related to the amount of attention paid by the pet owner during the measuring operation, which the result that the amounts of food provided to an animal are not accurate unless a certain level of metal effort is expended in feeding the animal a predetermined amount of food. Alternatively, an electronically-operated portion control food dispenser can be costly, and the electronics are operated either by batteries which require periodic replacement or AC power which limits the location of the device to a position nearby an electrical outlet. It thus would be desired to provide an improved solution that overcomes certain shortcomings known in the relevant art.

SUMMARY

An improved manual portion control feeder includes a food delivery mechanism that is in communication with a food reservoir and which, when actuated, dispenses a predetermined amount of food from the reservoir into another vessel. Advantageously, the feeding apparatus further includes a feedback mechanism which, responsive to an actuation of the food delivery mechanism, provides at least one of an acoustic indication and a tactile indication that is representative of the dispensing of a predetermined quantity of food by the food delivery mechanism. The acoustic and/or tactile indication enables the feeding apparatus to remain disposed on, for example, a floor and alerts the user that a predetermined amount of food has been dispensed from the reservoir since the acoustic and/or tactile indications are detectable with relative ease. This enables an animal to be provided a predetermined amount of food with minimal attention being required of the user.

Accordingly, an aspect of the disclosed and claimed concept is to provide an improved feeding apparatus that facilitates the feeding of a predetermined amount of food to an animal.

Another aspect of the disclosed and claimed concept is to provide an improved feeding apparatus that provides at least one of an acoustic indication and a tactile indication that is representative of a predetermined amount of food being delivered to an animal for consumption.

Another aspect of the disclosed and claimed concept is to provide an improved feeding apparatus that stores a quantity of food and that further includes a removable bowl that is washable to avoid contamination of the stored quantity of food.

Another aspect of the disclosed and claimed concept is to provide a feeding apparatus having a cover apparatus that resists actuation of a food delivery mechanism by an animal.

Accordingly, aspects of the disclosed and claimed concept are provided by an improved feeding apparatus that is structured to dispense food, the general nature of which can be stated as including a housing, a food delivery mechanism, and a feedback mechanism. The housing can be stated as including a reservoir structured to have an amount of food situated therein and another vessel. The food delivery mechanism is situated on the housing and is structured to be in communication with the reservoir, the food delivery mechanism having a manual input element which, when actuated, is structured to dispense food from the reservoir into the another vessel. The feedback mechanism is situated on at least one of the housing and the food delivery mechanism and is structured, responsive to an actuation of the food delivery mechanism, to provide at least one of an acoustic indication and a tactile indication that is representative of the dispensing of a predetermined quantity of food by the food delivery mechanism.

Other aspects of the disclosed and claimed concept are provided by an improved feeding apparatus that is structured to dispense food, the general nature of which can be stated as including a housing, a food delivery mechanism, and a cover apparatus. The housing can be stated as including a housing a reservoir structured to have an amount of food situated therein and another vessel. The food delivery mechanism is situated on the housing and is structured to be in communication with the reservoir, the food delivery mechanism having a manual input element which, when actuated, is structured to dispense food from the reservoir into the another vessel. The cover apparatus is situated on the housing and is structured to be movable between a first position and a second position, the cover in the first position overlying at least a portion of the food delivery mechanism and being structured to resist actuation of the food delivery mechanism, the cover in the second position permitting actuation of the food delivery mechanism.

BRIEF DESCRIPTION OF THE DRAWINGS

A further understanding of the disclosed and claimed concept can be gained from the following Description when read in conjunction with the accompany drawings in which:

FIG. 10 is a front perspective view of an improved feeding apparatus in accordance with a second embodiment of the disclosed and claimed concept, with a cover apparatus thereof being in a first position; and FIG. 11 is a view similar to FIG. 10, except depicting the cover apparatus in a second position.

Similar numerals refer to similar parts throughout the specification.

DESCRIPTION

Figure 1:
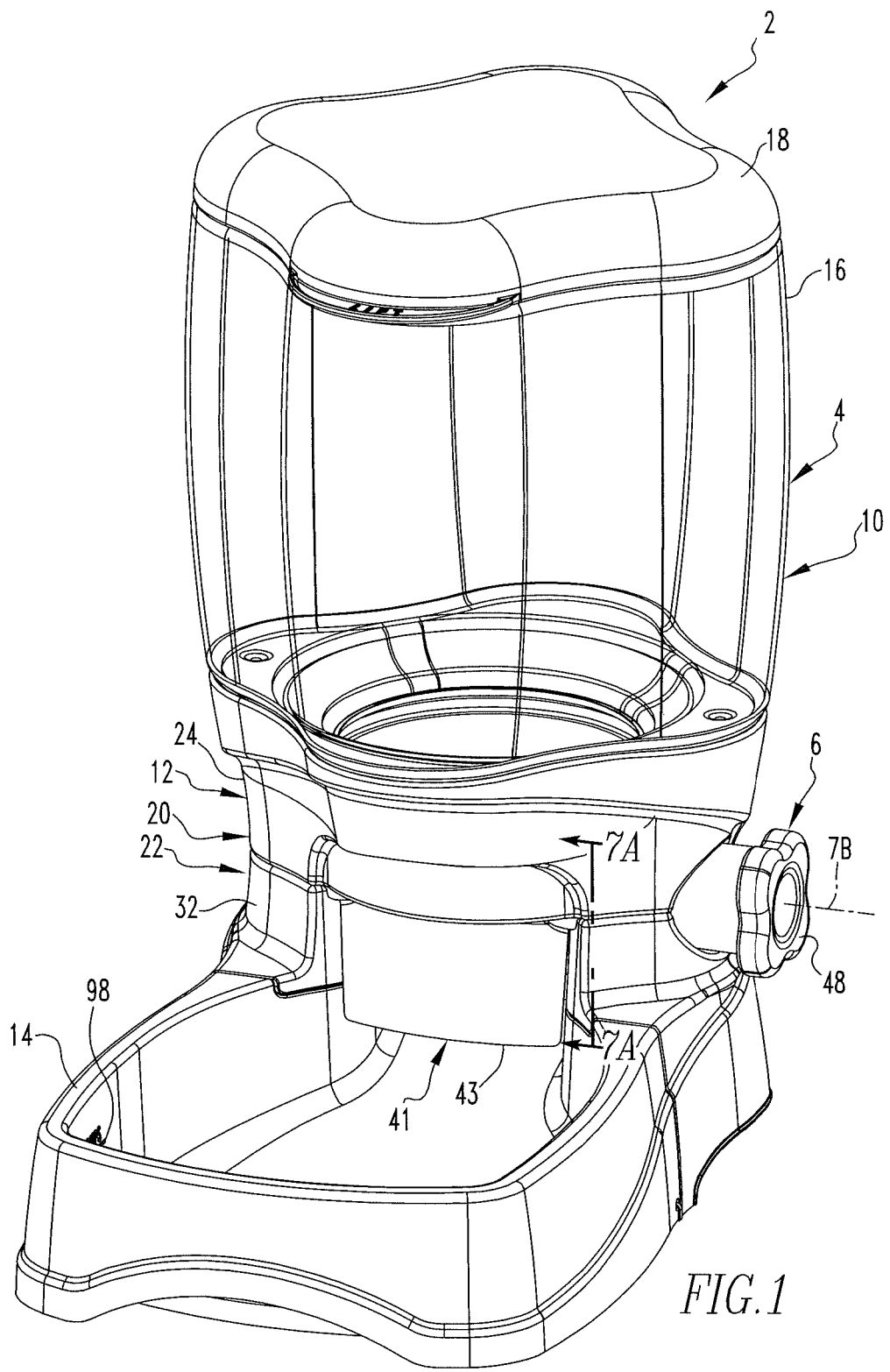
FIG. 1 is a front perspective view of an improved feeding apparatus in accordance with a first embodiment of the disclosed and claimed concept.
Figure 2:
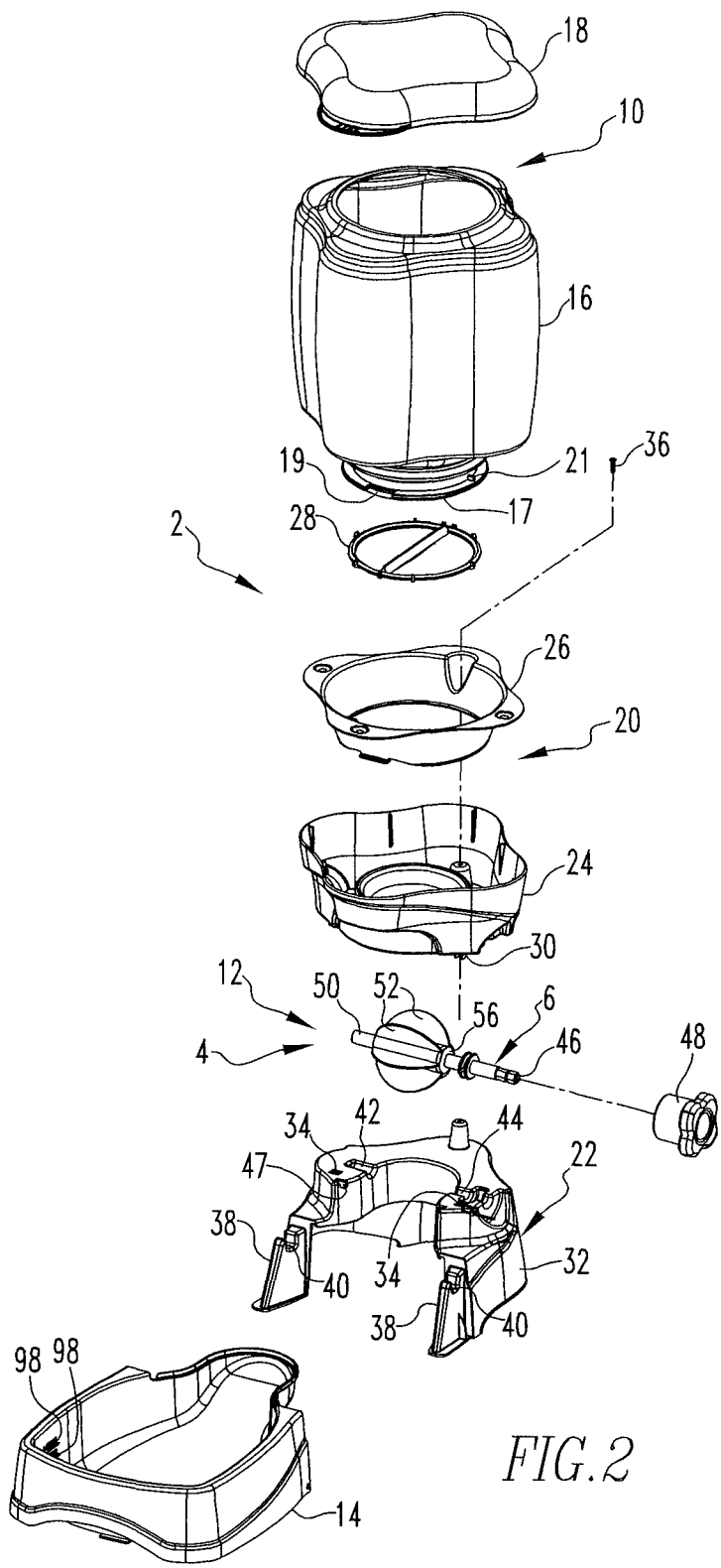
FIG. 2 is an exploded perspective view of portions of the feeding apparatus of FIG. 1.

An improved feeding apparatus 2 in accordance with a first embodiment of the disclosed and claimed concept is depicted generally in FIG. 1 and is depicted in an exploded fashion in FIG. 2. The feeding apparatus 2 can be said to include a housing 4, a food delivery mechanism 6, and a feedback mechanism 8 (which can be understood in conjunction with FIGS. 7A, 7B, and 7C). As will be set forth in greater detail below, the food delivery mechanism 6, when actuated, is configured to dispense a predetermined quantity of food and, responsive thereto, the feedback mechanism 8 is configured to output an acoustic indication, a tactile indication, or both that is representative of the fact that the predetermined quantity of food has been dispensed by the food delivery mechanism 6.

As can be understood from FIGS. 1 and 2, the housing 4 can be said to include a hopper 10, a support 12, and a bowl 14. The hopper 10 can be said to include a container 16 and to further include a removable lid 18 that is removably situated on the container 16. The container 16 is structured to serve as a reservoir of particulate food, such as pet food or other appropriate material. As will be set forth in greater detail below, the food (not expressly depicted herein) that is stored in the container 16 is dispensed via the food delivery mechanism 6 into the bowl 18.

The container 16 comprises a flange 17 having one or more slots 19 formed therein that are cooperable with corresponding structures (not expressly depicted herein for reasons of simplicity of disclosure) on the housing 4 which enable the container 16 to be received on the housing 4 along the longitudinal axis of the container 16 (which corresponds with the vertical direction from the perspective of FIG. 2). The container 16 further includes one or more upstanding stops 21 that are situated on the flange 17. When the container 16 is situated on the housing 4 (i.e., with the slots 19 cooperated with the corresponding structures of the housing 4) and is rotated about the longitudinal axis, the stops 21 engage other corresponding structures (not expressly depicted herein for reasons of simplicity of disclosure) on the housing 4 which limit further rotation in the same rotational direction. The slotted flange 17 and the stops 21 are thus cooperable with the housing 4 to advantageously provide a secure connection between the container 16 and the housing 4, which desirably resists an aggressive animal from separating the container 16 from the housing 4 and accessing the stored food.

Figure 6:
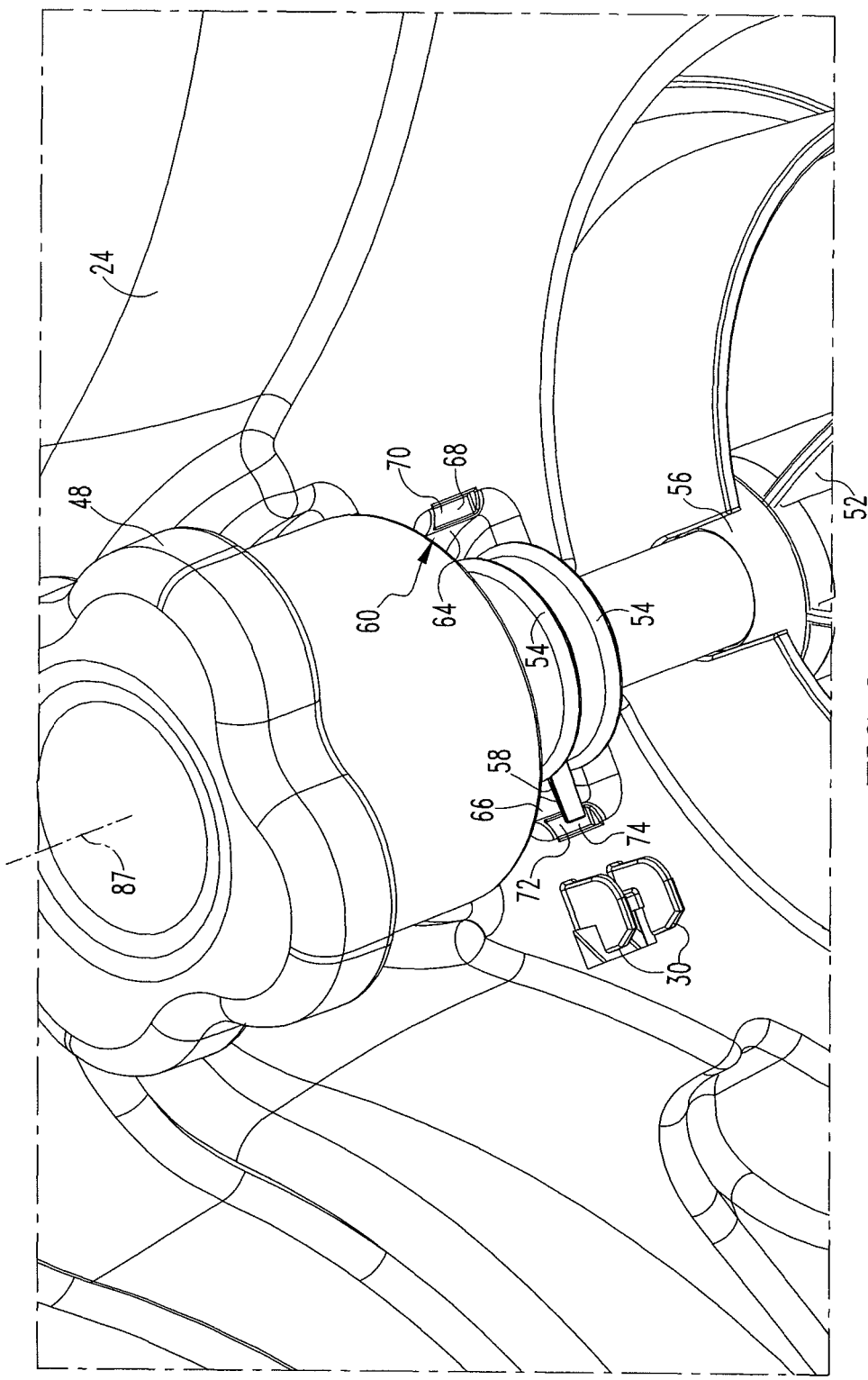
FIG. 6 is a perspective view of another portion of the housing with the food delivery mechanism situated thereon.

The support 12 can be said to include a first support apparatus 20 and a second support apparatus 22, many of the elements of which are depicted in detail in FIG. 2. The first support apparatus 20 can be said to include a first support element 24 upon which are disposed a transition element 26 and a safety ring 28. The transition element 26 provides a physical transition between the relatively wide width of the container 16 and the relatively narrow mouth of the container 16 and resists food particles from being lost or situated within the first support element 24 in a fashion that might otherwise interfere with the operation of the feeding apparatus 2. The safety ring 28 resists an animal's muzzle from becoming caught in the mouth of the container 16 in the event that an aggressive animal somehow manages to separate the first support apparatus 20 from the second support apparatus 22. The first support apparatus 20 further includes a set of lugs 30, some of which are depicted in FIG. 6, and which are engageable with the second support apparatus 22.

More particularly, the second support apparatus 22 includes a second support element 32 having a number of receptacles 34 formed therein that are structured to receive the lugs 30 when the feeding apparatus 2 is assembled. As employed herein, the expression "a number of" and variations thereof shall refer broadly to any non-zero quantity, including a quantity of one. The second support apparatus 22 further includes a fastener 36 which is receivable through a hole formed in the first support element 24 and which is engageable with another hole formed in the second support element 32 to secure together the first and second support apparatuses 20 and 22 when the lugs 30 are received in the receptacles 34. It is noted that other assembly and retention methodologies can be employed without departing from the present concept.

The second support apparatus 22 further includes a pair of arms 38 that protrude from the second support element 32 and which each have a retention element 40 formed therein that is cooperable with a corresponding structure on the bowl 14. The arms 38 and the retention elements 40 enable the bowl 14 to be removable from the feeding mechanism 2, as will be set forth in greater detail below.

Figure 5:
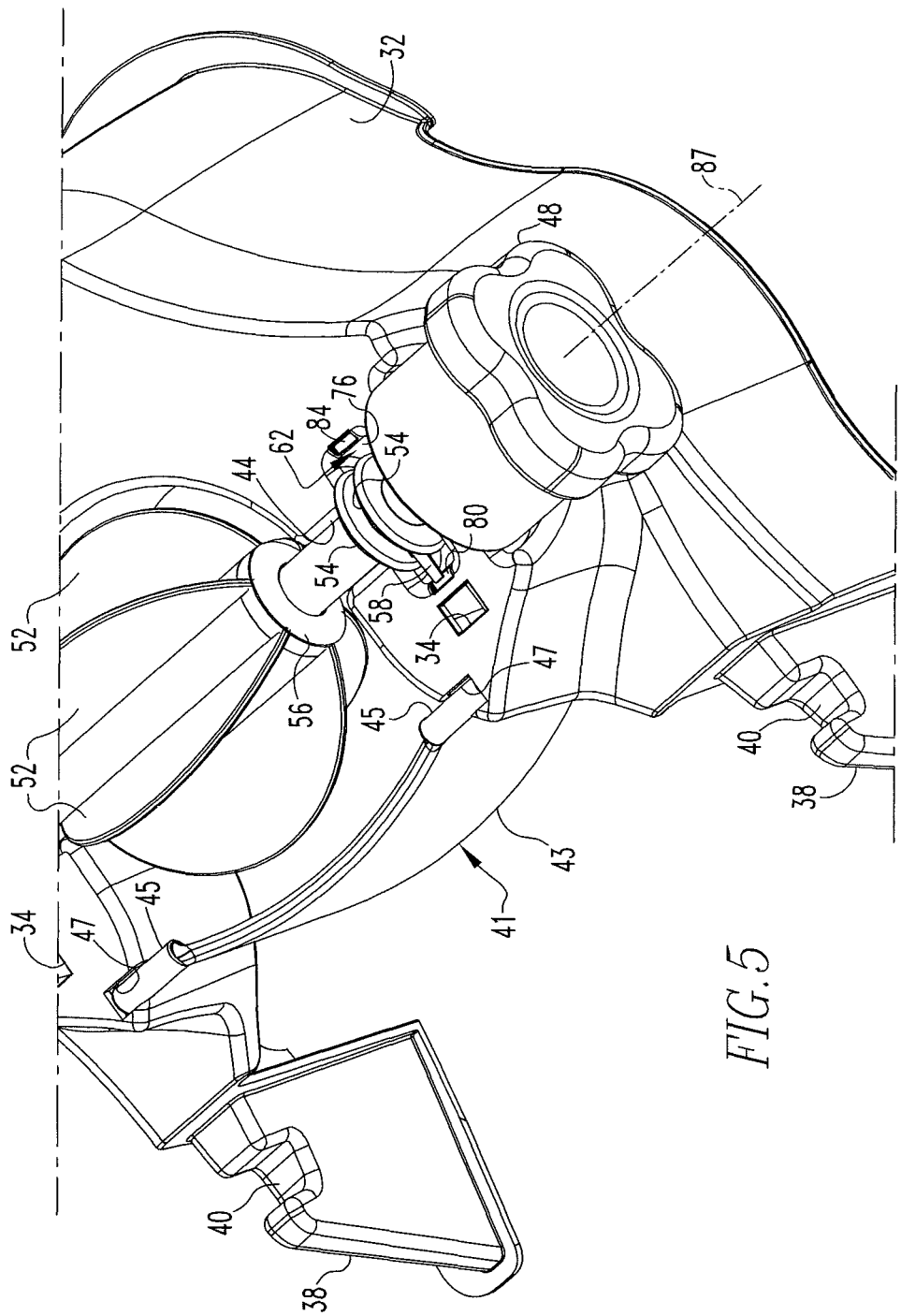
FIG. 5 is a perspective view of a portion of a housing of the feeding apparatus with the food delivery mechanism situated thereon.

The second support apparatus 22 additionally includes a shield apparatus 41 that is depicted in FIGS. 1 and 5, but which is not expressly depicted in FIG. 2 for reasons of simplicity of illustration. The shield apparatus 41 can be said to include a shield element 43 from which extend a pair of posts 45 that are received in correspondingly sized and shaped seats 47 formed on the second support element 32. The posts 45 can be seen in FIG. 5 to extend in generally opposite directions away from the shield element 43 and to support the shield element 43 on the second support element 32. The shield element 43 will be discussed in greater detail below.

The second support element 32 further includes a first bearing region 42 and a second bearing region 44 formed thereon, both of which may be of a partially generally cylindrical shape and are configured to rotatably receive thereon a portion of the food delivery mechanism 6. The first support element 24 likewise includes corresponding bearing regions (not expressly depicted herein) which enable the food delivery mechanism 6 to be rotatably retained between the first and second support apparatuses 20 and 22.

Figure 3:
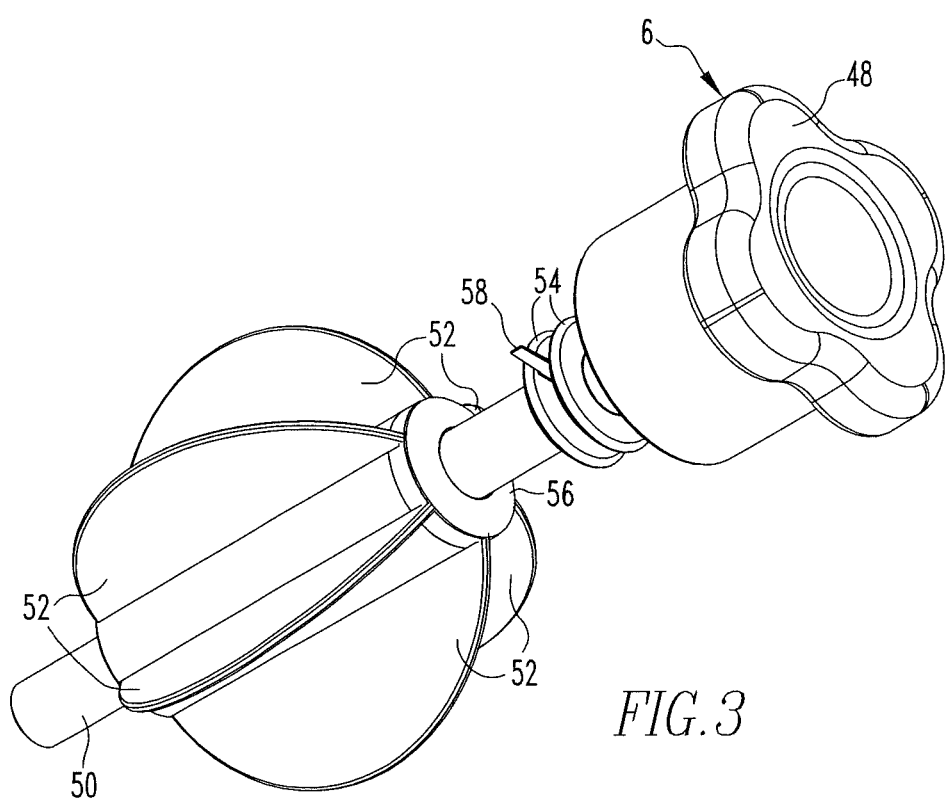
FIG. 3 is a perspective view of a food delivery mechanism of the feeding apparatus of FIG. 1.
Figure 4:
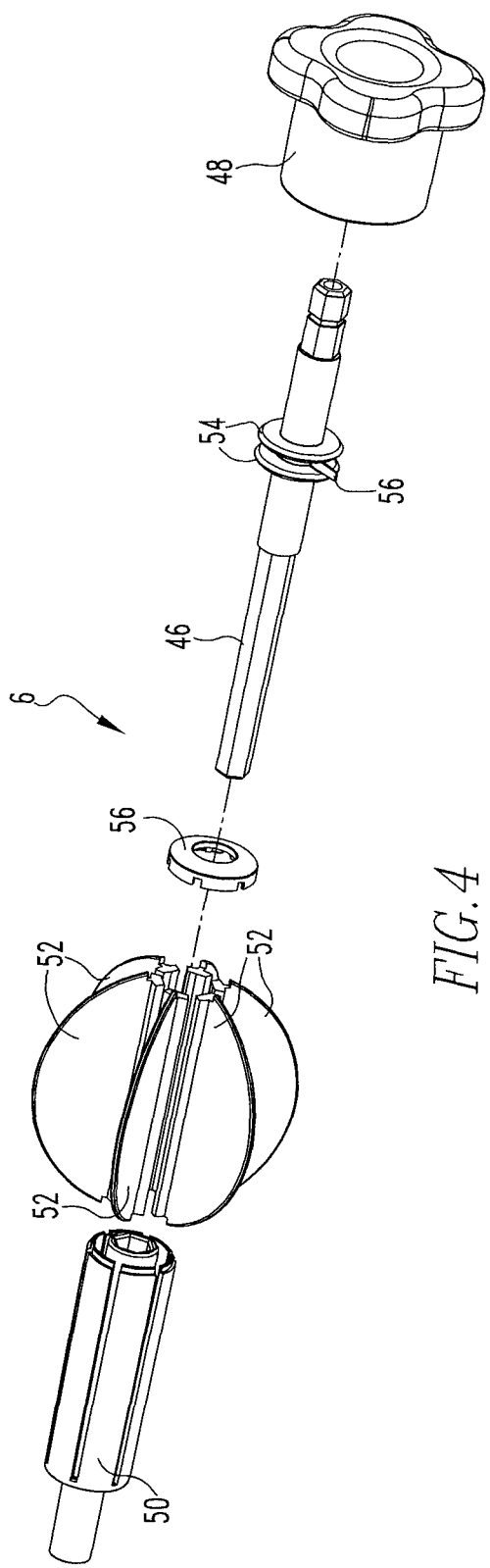
FIG. 4 is an exploded depiction of the food delivery mechanism of FIG. 3.

As can be seen in FIGS. 3 and 4, the food delivery mechanism can be said to include an elongated shaft 46, a handle 48, a positioning element 50, a plurality of paddles 52, a pair of flanges 54, and a retainer 56. In the depicted exemplary embodiment, the shaft 46 is of a polygonal (i.e., hexagonal) cross-sectional shape, but it is noted that such polygonal configuration is intended to secure the various components of the food delivery mechanism 6 onto the shaft 46 and to resist relative rotation therebetween, and it is thus understood that the shaft 46 can be of other polygonal shapes or can alternatively or additionally employ other structures of methodologies to retain the various components of the food delivery mechanism 6 on the shaft 46 without departing from the present concept.

The handle 48 is situated at one end of the shaft 46, and the positioning element 50 is situated at an opposite end of the shaft 46 and retains the paddles 52 in relative positions that protrude radially away from the shaft 46. The retainer 56 is situated on the shaft 46 and is engaged with the paddles 52 to further retain the paddles 52 in position on the shaft 46. While in the depicted exemplary embodiment a total of six paddles 52 are provided, it is understood that in other embodiments different quantities of paddles can be employed without departing from the present concept. The two flanges 54 are disposed on the shaft 46 at a position situated generally between the paddles 52 and the handle 48 and are structured to have situated therebetween a tab 58 of the feedback mechanism 8.

More particularly, the feedback mechanism 8 includes the aforementioned tab 58 as well as a first deflection element 60 (FIGS. 6, 7A, 7B, and 7C) situated on the first support element 24 and a second deflection element 62 (FIGS. 5, 7A, 7B, and 7C) situated on the second support element 32. As can be understood from FIG. 6, the first deflection element 60 includes a first compression element 64 that is of a generally semi-annular shape and which has an arcuate first compression surface 66 formed thereon that is of a generally semi-cylindrical shape. The first deflection element 60 further includes a first abutment element 68 having a first ledge surface 70, and further includes a second abutment element 72 having a second ledge surface 74. The first and second abutment elements 68 and 72 are situated at opposite ends of the first compression element 64.

As can be seen in FIG. 5, the second deflection element 62 includes a second compression element 76 that is of a semi-annular configuration and which has an arcuate second compression surface 78 formed thereon that is of a generally semi-cylindrical shape. The second deflection element 62 further includes a third abutment element 80 having a third ledge surface 82 and further includes a fourth abutment element 84 having a fourth ledge surface 86. The third and fourth abutment elements 80 and 84 are situated at opposite ends of the second compression element 76.

It can be understood from FIGS. 5 and 6 that the first and second deflection elements 60 and 62 are of substantially the same configuration and face generally toward one another to form a generally cylindrical region 85 (FIGS. 7A, 7B, and 7C) within which the flanges 54 are rotatably situated. It also can be understood from FIGS. 5 and 6 that the food delivery mechanism 6 is rotatable about an axis of rotation 87 that can be said to extend generally centrally through the shaft 46. The semi-annular shape of the first compression element 64 results in a semi-cylindrical first region 88 that is situated adjacent the first compression surface 66, and the semi-annular shape of the second compression element 76 likewise forms a semi-cylindrical second region 89 that is situated adjacent the second compression surface, and the first and second regions 88 and 89 together form the region 85. Radial movement of the food delivery mechanism 6 is thus generally limited by the housing 4 to rotation about the axis of rotation 87, and longitudinal movement of the food delivery mechanism 6 along the axis rotation 87 is generally resisted by the flanges 54 being situated in the first and second regions 88 and 89. The flanges 54 further protect the tab 58 by resisting such longitudinal movement and avoiding the tab from undesirably engaging the lateral walls of the housing 4 adjacent the region 85.

The tab 58 is an elastically deflectable element that protrudes outwardly from the shaft 46 and which can be formed of plastic, metal or other appropriate resilient and tough material. The tab 58 interacts with the first and second deflection elements 60 and 62 and, in the depicted exemplary embodiment, provides both an acoustic indication and a tactile indication that the food delivery mechanism 6 has been actuated by rotating the food delivery mechanism 6 through a predetermined angle of rotation about the axis of rotation 87. In the depicted exemplary embodiment, the predetermined angle of rotation is 180°, although in other embodiments the predetermined angle of rotation can be less or more depending upon the needs of the particular application.

Figure 7A:
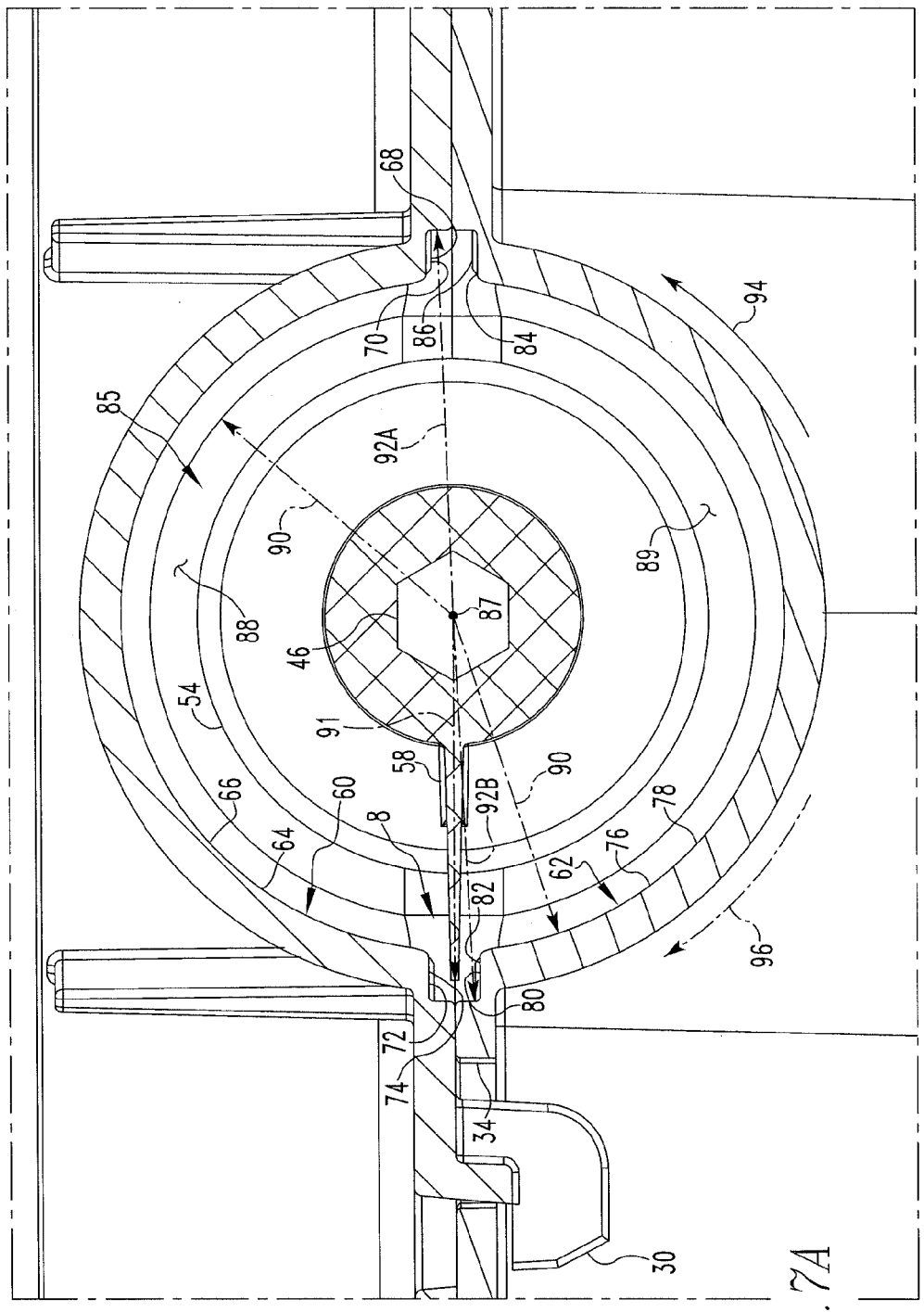
FIG. 7A is a sectional view as taken along line 7A-7A of FIG. 1 and depicts a portion of a feedback mechanism of the feeding apparatus of FIG. 1 prior to an actuation of the food delivery mechanism.

As can be understood from FIG. 7A, the first and second compression surfaces 66 and 78 are spaced an equal distance from the axis of rotation 87, as is represented at the numeral 90. The tab 58 extends outwardly from the shaft 46 another distance 91 from the axis of rotation 87. The first and second ledge surfaces 70 and 74 protrude equal distances (indicated at the numerals 92A and 92B, respectively) from the axis of rotation 87, and it can be understood from FIGS. 7A, 7B, and 7C that the third and fourth ledge surfaces 82 and 86 protrude the same distance from the axis of rotation 87. The distances 92A and 92B are greater than the distances 87 and 91, and the distance 91 is greater than the distance 87.

Figure 7B:
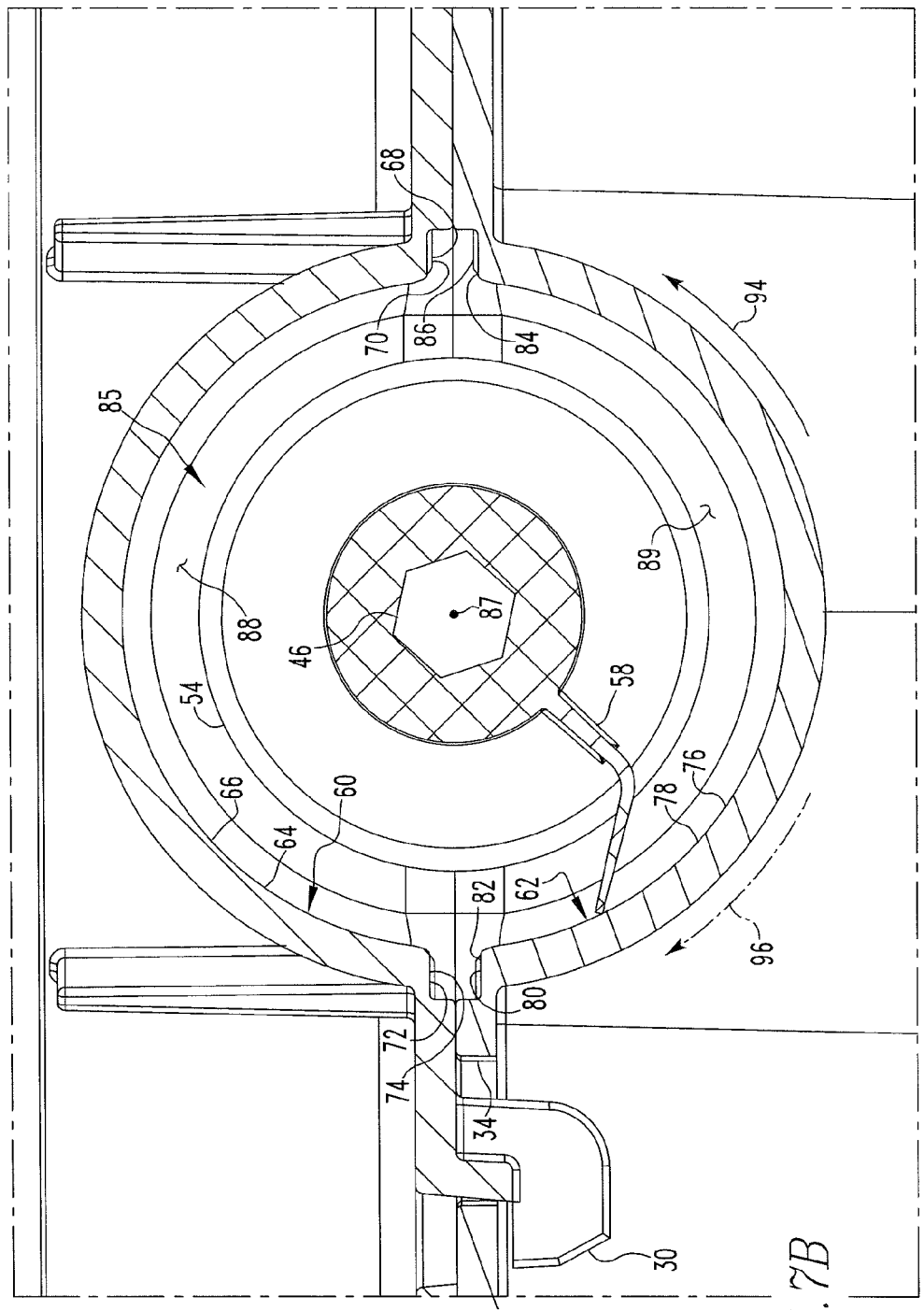
FIG. 7B is a view similar to FIG. 7A, except depicting the portion of the feedback mechanism during a first portion of an actuation of the food delivery mechanism.
Figure 7C:
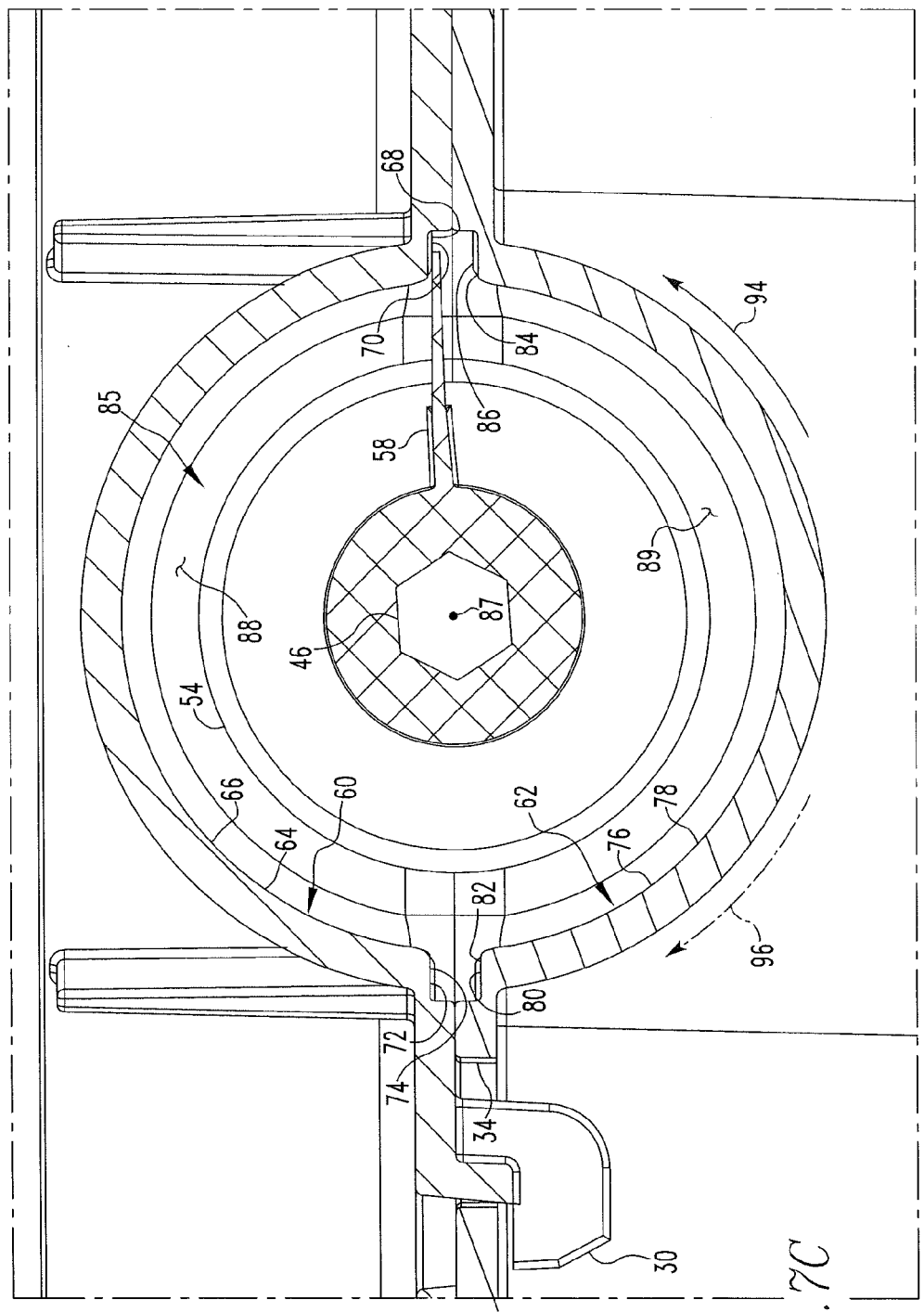
FIG. 7C is a view similar to FIG. 7B, except depicting the feedback mechanism during a second portion of the actuation of the food delivery mechanism.

FIGS. 7A, 7B, and 7C generally depict rotation of the food delivery mechanism 6 in a first rotational direction that is represented by an arrow which indicated at the reference numeral 94. It is understood that the food delivery mechanism 6 is additionally rotatable in an opposite direction which is indicated with an arrow depicted in phantom lines and which bears the reference numeral 96. The food delivery mechanism 6 is freely rotatable in both the first and second rotational directions 94 and 96.

When the food delivery mechanism 6 is positioned such that the tab 58 is situated generally between the second and third ledge surfaces 74 and 82 (as is depicted generally in FIG. 7A), and when the food delivery mechanism 6 is then actuated by rotating the handle 48 and thus the shaft 46 in the first rotational direction 94, the tab 58 is elastically deflected due to its engagement with the second deflection element 62, and the tip of the tab 58 slides along the second compression surface 78 as is depicted generally in FIG. 7B. Such elastic deflection of the tab 58 causes the tab 58 to store therein an amount of deflection energy, which is an amount of elastic potential energy that is generally equal to the amount of energy that was required to elastically deflect the tab 58. For the sake of completeness, it is to be understood that the tab 58 can likewise and alternatively be elastically deflected due to engagement with the first deflection element 60 and have its tip slide along the first compression surface 66 (not expressly depicted herein for reasons of simplicity of disclosure). Upon reaching the end of the second compression element 76 of the second deflection element 62, i.e., where the fourth abutment element 84 is disposed, the tab 58 becomes disengaged from the second deflection element 62. Upon such disengagement, the tab 58 is elastically returned toward its free and undeflected state, and in so doing strikes the first abutment element 68 of the first deflection element 60 as is depicted generally in FIG. 7C. Such a strike involves a transfer of at least a portion of the deflection energy from the previously-deflected tab 58 into the first deflection element 60 or the shaft 46 or both, and such energy transfer in the depicted exemplary embodiment results in both an audible indication that can be heard by the user as well as a tactile indication that can be felt by the user. More particularly, the energy transferred from the tab 58 to the first deflection element 60 can be said to include an energy component that is communicated through the housing 4 and that is detectable by the user in an auditory fashion, meaning that the energy component results in an audible click sound. Additionally, the energy transferred from the tab 58 includes an energy component that is communicated through the shaft 46 and is detectable by the user in tactile fashion at the handle 48.

FIG. 7A depicts the tab 58 in a free and undeflected state (which is also the state of the tab 58 as depicted generally in FIGS. 3-6) and being situated generally between the second and third abutment elements 72 and 80. Such a position could be considered to be one that is prior to an actuation of the food delivery mechanism 6. FIG. 7B depicts the tab 58 in an elastically deflected condition engaged with the second compression surface 78 during a first portion of an actuation of the food delivery mechanism 6. Upon continued rotation of the food delivery mechanism 6 in the first rotational direction 94 beyond that depicted generally in FIG. 7B, the tab 58 reaches the end of the second deflection element 62 (where the fourth abutment element 84 is disposed), and the tab 58 is released from engagement with the second compression surface 78. Such release causes the tab 58 to elastically return toward its free and undeflected state, and further causes the aforementioned strike of the tab 58 on the first abutment element 68 (as in FIG. 7C) and consequent transfer of at least a portion of the deflection energy in the tab 58 to the first deflection element 60. Another portion of the deflection energy in the tab 58 is transferred to the shaft 46.

The strike of the tab 58 on the first abutment element 68 can, as mentioned above, be said to occur during a second portion of the actuation of the food delivery mechanism 6, after which the actuation of the food delivery mechanism 6 can be said to end. The strike of the tab 58 against the first abutment 68 causes the aforementioned acoustic and tactile indications which correspond with a rotation of the food delivery mechanism 6 through the aforementioned predetermined angle of rotation. Such a rotation of the food delivery mechanism 6 would have caused the food that was engaged between adjacent pairs of the paddles 52 to have been dispensed from the hopper 10 into the bowl 14. The acoustic and tactile indications thus are representative of a predetermined quantity of food situated between three pairs of adjacent paddles 52 being dispensed into the bowl 14. In the depicted exemplary embodiment, the predetermined quantity of food that is dispensed upon an actuation of the food delivery mechanism 6 is one-half cup of food, although in other embodiments the food delivery mechanism can be configured to deliver other amounts of food depending upon the configuration needed.

As can further be understood from FIGS. 7A, 7B, and 7C, the food delivery mechanism 6 can be further rotated in the first rotational direction 94 beyond the position depicted generally in FIG. 7C (where the tab 58 is depicted as being situated generally between the first and fourth abutment elements 68 and 84) to a further position such as is depicted generally in FIG. 7A (where the tab is depicted as being situated generally between the second and third abutment elements 72 and 80). It thus can be understood that when the food delivery mechanism 6 is rotated in the first rotational direction 94, the tab 58 is configured to strike the first and third ledge surfaces 70 and 82 to provide audible and tactile indications which each correspond with the dispensing of the predetermined quantity of food from the hopper 10 into the bowl 14. It can likewise be understood that the food delivery mechanism 6 is rotatable in the second rotational direction 96 to cause the tab 58 to strike the second and fourth ledge surfaces 74 and 86 to thereby create audible and tactile feedback with each such strike, and with each such strike (and the corresponding acoustic and tactile feedback) corresponding with the dispensing of a predetermined quantity of food from the hopper 10 into the bowl 14.

While the feedback mechanism 8 is depicted herein as generating the aforementioned acoustic and tactile feedback upon a 180° rotation of the food delivery mechanism 6, it is understood that in other embodiments the feedback mechanism can be configured so that such audible and tactile feedback are provided upon a different angle of rotation of the food delivery mechanism 6. Moreover, it is not necessarily required that both acoustic and tactile feedback be provided, it being understood that either could be usable by a pet owner to determine that the predetermined quantity of food has been dispensed from the hopper 10 into the bowl 14. In this regard, an electronic system could be configured to output an audible sound from a loudspeaker, and other electronic structures can be configured to provide a tactile feedback via the handle 48 without departing from the present concept.

It can be understood that the feeding apparatus 2 will typically be situated upon a floor or other such surface where the animal that is intended to consume the food in the bowl 14 is likewise situated. A human user typically will need to bend over or otherwise move to enable the user's hand can engage the handle 48 to actuate the food delivery mechanism 6. The acoustic indication, the tactile indication, or both thus can apprise the user that a predetermined quantity of food has been dispensed from the feeding apparatus 2, and such acoustic and tactile indications are discernable without requiring the user to, for instance, visually observe the rotational angle through which the food delivery mechanism 6 has been turned. That is, the user can simply rotate the food delivery mechanism 6 until an audible or tactile feedback is detected or until a desired quantity (i.e., plural) of acoustic and/or tactile feedbacks have been detected, after which the owner knows that the predetermined quantity of food (or a multiple of the predetermined quantity of food, depending upon the needs of the animal) has been dispensed into the bowl 14. The acoustic and/or tactile indications provided by the feedback mechanism 8 thus advantageously inform the user that a desired quantity of food has been dispensed into the bowl 14 with minimal attention being required of the user.

Figure 8:
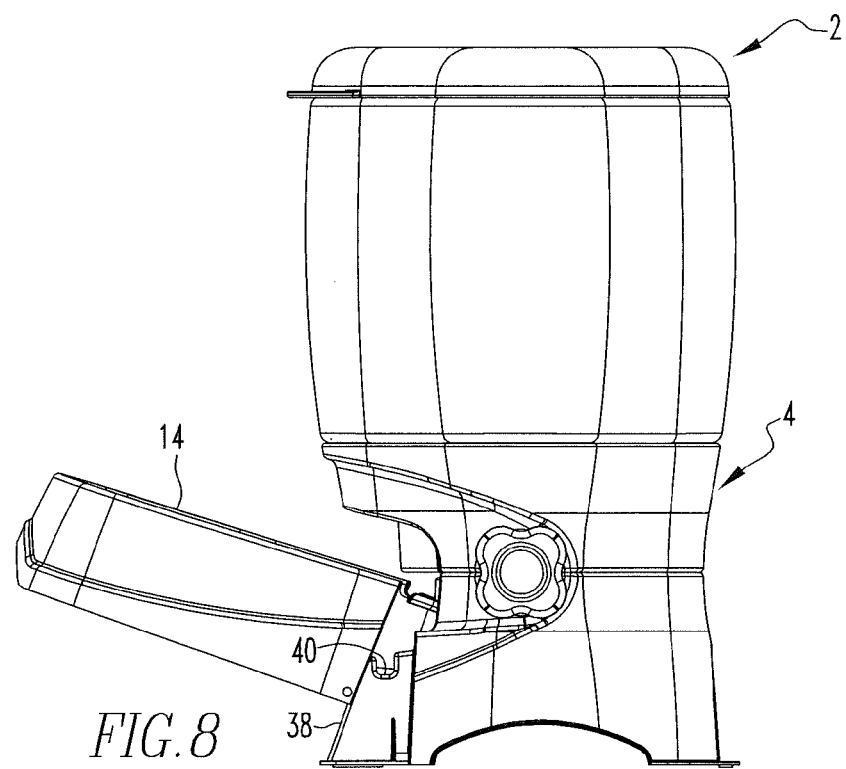
FIG. 8 is a side elevational view of the feeding apparatus of FIG. 1, except depicting a bowl of the housing being pivoted away from other portions of the housing.
Figure 9:
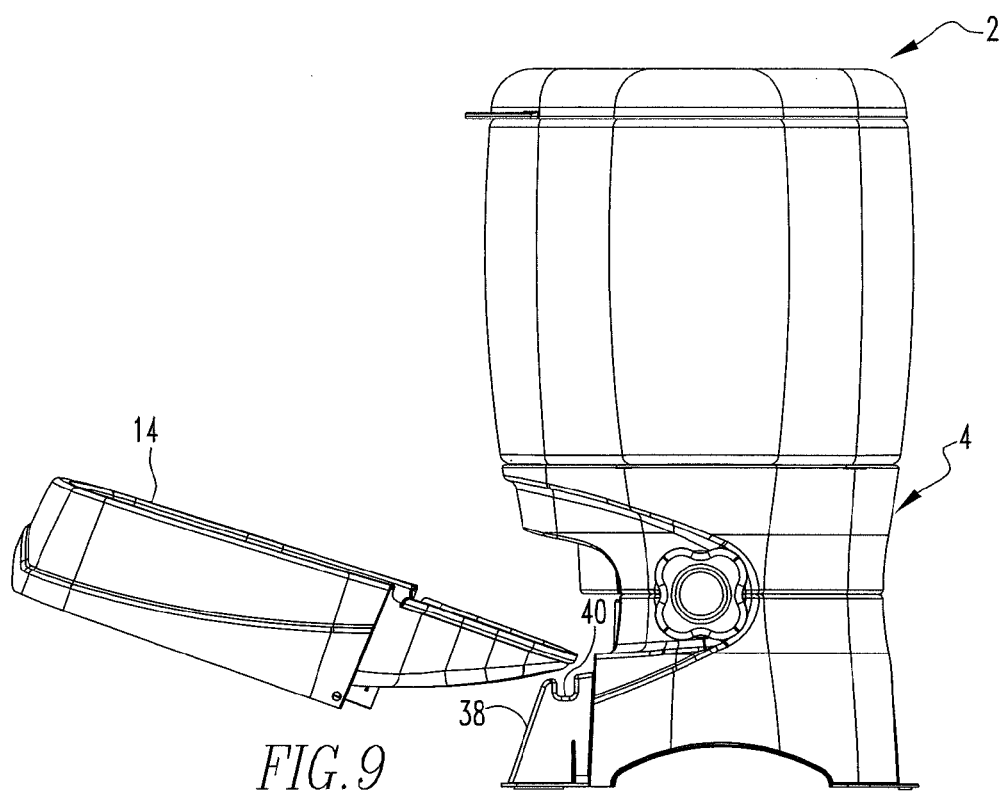
FIG. 9 is view similar to FIG. 7, except depicting the bowl removed from the other portions of the housing.

Further advantageously, the bowl 14 includes a number of graduations 98 (FIG. 2) formed or otherwise indicated thereon in the region into which the food will be dispensed upon actuation of the food delivery mechanism 6. As a further mode of operation, the graduations 98 can be employed by the user to visually gauge the quantity of food that has been dispensed into the bowl 14. By way of example, if the user desires to feed an animal using ten actuations of the food delivery mechanism, the user can rotate the handle 48 until ten sets of acoustic and/or tactile indications are detected. However, and as an alternative, the user could instead simply rotate the handle 48 until the quantity of food that has been dispensed into the bowl 14 reaches a desired one of the graduations 98. This enables the user to dispense food into the bowl 14 while requiring even less attention of the user in doing so, i.e., the user can note the acoustic and/or tactile indications as signals which represent the continued dispensing of food, but can more particularly rely on the food reaching a desired graduation 98 to know that a desired quantity of food has been dispensed for the animal. While in such a fashion the acoustic and/or tactile indications can be employed by the user pursuant to an awareness of the continued dispensing of food into the bowl 14, the dispensing of food can be continued until the food reaches the desired one of the graduations 98, which can simplify the feeding of an animal Also advantageously, the shield element 43 is situated generally between the paddles 52 and the bowl 14 and thus fully or at least partially obstructs the paddles 52 from the view of the animal that eats from the bowl 14. Since the paddles 52 dispense the food from the container 16 into the bowl 14, the paddles 52 have the potential to be a source of intense interest and fascination by an animal who may try to chew or otherwise manipulate the paddles 52 seeking to cause them to dispense additional food. By providing the shield element 43, the paddles 52 are partially or fully obstructed from the view of the animal, which advantageously avoids the animal from attempting to access the paddles 52, thereby avoiding damage to the feeding apparatus 2 as well as the animal As can be understood from FIGS. 8 and 9, the bowl 14 is pivotable out of engagement with the retention elements 40 and is removable from the second support apparatus 22. Such removability of the bowl 14 enables the bowl 14 to be cleaned. In this regard, it is understood that saliva and dirt from the animal and other contaminants can exist in the bowl 14. Further in this regard, it is understood that such contaminants, if left in the bowl 14, potentially could infiltrate the hopper 10 and result in a contamination of the food stored therein. As such, since the feeding apparatus 2 includes the hopper 10 which stores therein an amount of food, the bowl 14 is advantageously removable from the feeding apparatus 2 to permit its cleaning and to thereby advantageously avoid contamination of the stored food.

An improved feeding apparatus 102 in accordance with a second embodiment of the disclosed and claimed concept is depicted generally in FIGS. 10 and 11. The feeding apparatus 102 includes essentially all of the components of the feeding apparatus 2, and additionally includes a cover apparatus 103 situated on its housing 104. For the sake of completeness, it is noted that the feeding apparatus 102 is depicted in FIGS. 10 and 11 with the shield apparatus (shown at the numeral 41 in FIGS. 1 and 5 in association with the feeding apparatus 2) removed in order to illustrate how advantageously the shield apparatus 41 blocks (in FIG. 1) from the view of the animal the paddles 52. It is understood that the feeding apparatus 102 includes the shield apparatus 41.

The cover apparatus 103 can be said to include a cover 105 and a lock 107. The cover 105 is movable between a first position that is depicted generally in FIG. 10 and a second position that is depicted generally in FIG. 11. In the first position, the cover 105 generally overlies the handle 148 and resists or prevents access thereto by an aggressive animal. In the second position, however, the handle 148 is exposed and thus permits the handle 148 to be rotated the predetermined rotational distance to enable the food delivery mechanism 106 to dispense the predetermined quantity of food in association with the aforementioned audible and tactile indications. In the depicted exemplary second embodiment, the cover 105 is pivotable between the first and second positions.

The lock 107 can be said to include a tab 109 that protrudes from the cover 105 and to further include a receptacle 111 formed in the housing 104 and that receives the tab 109 in the first position of the cover 105. It is understood, however, that in other embodiments the cover could be otherwise movable between its first and second positions and could employ other types of locks without departing from the present concept. The advantageous cover apparatus 103 thus maintains the integrity of the food stored by the feeding apparatus 102 and resists undesired access to the food by an aggressive or uncooperative animal.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A feeding apparatus configured to dispense food, comprising:

a housing comprising a reservoir structured to have an amount of food situated therein and another vessel;

a rotatable food delivery mechanism situated on the housing and configured to be in communication with the reservoir, the food delivery mechanism having a manual input element structured to dispense food from the reservoir into the another vessel when actuated; and a feedback mechanism situated on at least one of the housing and the food delivery mechanism configured to respond to a manual actuation of the food delivery mechanism to provide at least one of an acoustic indication and a tactile indication that is representative of the dispensing of a predetermined quantity of food by the food delivery mechanism, the feedback mechanism comprising a first structure situated on the food delivery mechanism and a second structure situated on the housing, the first and second structures being configured to engage one another upon rotation of the food delivery mechanism to generate the at least one of the acoustic indication and the tactile indication one of the first structure and the second structure comprising a protruding tab that is configured to be elastically deflected and elastically returned toward an undeflected free state upon rotation of the food delivery mechanism to generate the at least one of the acoustic indication and the tactile indication, the other of the first structure and the second structure further comprising a deflection element and an abutment element, the tab being deflected and engaged with the deflection element during a first portion of an actuation of the food delivery mechanism, the tab being elastically returned toward the undeflected free state and engaged with the abutment element to generate the at least one of the acoustic indication and the tactile indication during a second portion of the actuation of the food delivery mechanism, the deflection element comprising at least a first semi-annular compression element having an arcuate compression surface situated at a first distance from an axis of rotation of the food delivery mechanism, the abutment element comprising at least a first ledge surface situated on the at least first compression element and having an abutment surface extending a second distance from the axis of rotation of the food delivery mechanism, the second distance being greater than the first distance.

2. The feeding apparatus of claim 1, wherein
the abutment element comprises a second ledge surface situated on the at least first compression element and having another abutment surface extending a third distance from the axis of rotation of the food delivery mechanism, the third distance being greater than the first distance.

3. The feeding apparatus of claim 2, wherein
the at least first ledge surface is engageable by the tab upon a rotation of the food delivery mechanism in a first rotational direction, the second ledge surface being engageable by the tab upon a rotation of the food delivery mechanism in a second rotational direction opposite the first direction.

4. The feeding apparatus of claim 1, wherein
the tab extends a fourth distance from the axis of rotation of the food delivery mechanism, the fourth distance being greater than the first distance but less than the second distance.

* * * * *